United States Patent [19]

Sherman

[11] Patent Number: 5,558,175
[45] Date of Patent: *Sep. 24, 1996

[54] HYBRID POWER TRANSMISSION

[75] Inventor: James F. Sherman, Brighton, Mich.

[73] Assignee: General Motors Corporation, Detroit, Mich.

[*] Notice: The term of this patent shall not extend beyond the expiration date of Pat. No. 5,285,111.

[21] Appl. No.: 355,359

[22] Filed: Dec. 13, 1994

[51] Int. Cl.⁶ .................................................. B60K 6/00
[52] U.S. Cl. ...................... 180/65.2; 180/65.6; 290/4 C; 290/45
[58] Field of Search .................................. 180/65.2, 65.1, 180/65.3, 65.6, 65.7, 69.6; 290/4 C, 8, 45; 475/276

[56] References Cited

U.S. PATENT DOCUMENTS

| 2,127,655 | 4/1935 | Stromquist et al. | 475/276 |
| 3,623,568 | 11/1971 | Mori | 180/65.2 |
| 3,861,485 | 1/1975 | Busch | 180/65.7 |
| 4,319,140 | 3/1982 | Paschke | 290/4 C |
| 5,285,111 | 2/1994 | Sherman | 290/4 C |
| 5,337,848 | 8/1994 | Bader | 180/65.7 |
| 5,427,196 | 6/1995 | Yamaguchi et al. | 180/65.2 |
| 5,433,828 | 7/1995 | Moroto et al. | 180/65.2 |

FOREIGN PATENT DOCUMENTS

528412A1  2/1993  European Pat. Off. .............. 180/65.2

Primary Examiner—Kevin Hurley
Assistant Examiner—Min Yu
Attorney, Agent, or Firm—Donald F. Scherer

[57] ABSTRACT

An integrated power transmission has an internal combustion (IC) for engine power input, an electrical motor power input and a combining planetary transmission coupled with both power inputs. The power transmission also includes a multi-speed transmission input. The combining planetary transmission can be driven by the electric motor input only with a one-way device providing a reaction path for the combining planetary transmission and a stationary power input at the IC engine. A friction clutch member is provided to selectively establish a drive path including both power input members in a multi-speed transmission input. This clutch permits both power sources, electrical and internal combustion, to provide power to the combining planetary and also permits starting of the IC engine while the vehicle is in motion.

2 Claims, 2 Drawing Sheets

HYBRID POWER TRANSMISSION

TECHNICAL FIELD

This invention relates to power transmissions, and more particularly, to hybrid power transmissions having electrical input/reaction member in an internal combustion input member.

Specifically, this invention relates to such transmissions wherein the power input can be transferred between the input members during power transmission.

BACKGROUND OF THE INVENTION

Hybrid transmissions coordinate the torque output of an electric motor/generator and an internal combustion (IC) engine to provide an input torque to a multi-speed power transmission in a vehicle powertrain. The hybrid transmission can be considered as an input device similar to a torque converter or starting clutch. The hybrid transmission, however, has an advantage over other starting devices in that the motor/generator can provide drive to the control pump without the IC engine and can provide a starting device for the IC engine while also providing a power input to the multi-speed transmission.

SUMMARY OF THE INVENTION

The hybrid transmission, which is disclosed herein, will provide an IC engine starting device, both when the vehicle is stationary and in motion. When the vehicle is in motion, engine starting is accomplished by the engagement of a clutch assembly which enforces a load sharing condition, through a combining planetary gear arrangement, to split a motor/generator torque input between the IC engine and the multi-speed transmission input.

It is an object of this invention to provide an improved integrated hybrid power transmission for a vehicle powertrain, wherein a selectively engageable friction clutch is provided to permit starting of the IC engine while the vehicle is in motion.

It is another object of this invention, as set forth above, wherein a one-way brake is operable to prevent rotation of an engine output shaft and a planetary gear member connected thereto, such that a reduction drive between the electrical power input and the transmission output is provided or established.

It is a further object of this invention to provide an improved integrated hybrid power transmission having electrical power input and a combustion engine power input, wherein operation of the engine may be started or stopped while the vehicle is in motion or at rest.

It is yet a further object of this invention to provide an improved hybrid transmission, as set forth above, wherein a planetary gear arrangement is disposed for operation with a clutch member to establish a torque sharing path between a motor/generator, the engine and an input to a multi-speed power transmission.

These and other objects and advantages of the invention will be more apparent from the following description and drawings.

DESCRIPTION OF AN EXEMPLARY EMBODIMENT

Figure 1:
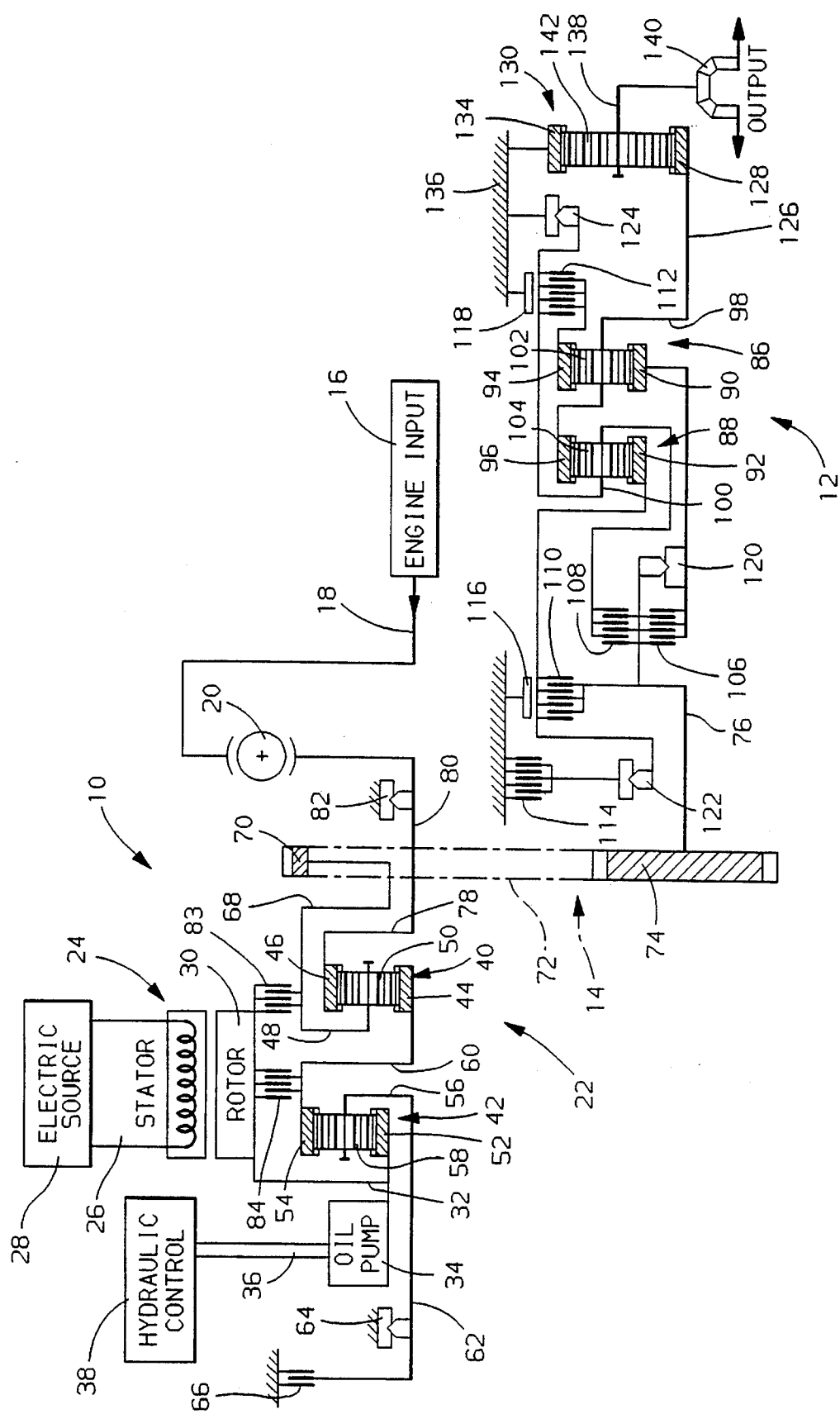
FIG. 1 is a schematic representation of a vehicle powertrain including a hybrid transmission having internal combustion engine input and a motor/generator input.

The powertrain shown in FIG. 1 includes a hybrid transmission, generally designated 10, a multi-speed planetary transmission, generally designated 12, and a chain drive 14 connected therebetween. The hybrid transmission 10 has an internal combustion (IC) engine 16 having an output shaft 18 which is drivingly connected through a damper 20 to a combining planetary gear arrangement 22.

The hybrid transmission 10 also includes a motor/generator 24 having a stator portion 26 connected with an electric source, such as a battery, 28, and a rotor portion 30. The rotor 30 is drivingly connected through a hub or like member 32 to a conventional positive displacement oil pump 34 which supplies fluid via a passage 36 to a conventional transmission hydraulic control 38. The rotor 30 is also connected with the combining planetary gear arrangement 22.

The combining planetary gear arrangement 22 includes a pair of planetary gear sets 40 and 42. The planetary gear set 40 has a sun gear 44, a ring gear 46, a carrier member 48, which rotatably supports a plurality of pinion gears 50 meshing with the sun gear 44 and the ring gear 46. The planetary gear set 42 has a sun gear 52, a ring gear 54 and a carrier member 56, which rotatably supports a plurality of pinion gears 58 meshing with the sun gear 52 and ring gear 54.

The sun gear 44 and ring gear 54 are interconnected by a hub 60, the carrier 56 is connected by a shaft 62 to a one-way brake 64 and a conventional fluid operated disc brake 66. The carrier 48 is connected through a hub 68 with a sprocket 70, which is a component in the chain drive 14. The sprocket 70 is connected via a chain 72 to a sprocket 74, which is connected to an input shaft 76 of the multi-speed planetary transmission 12.

The ring gear 46 of planetary gear set 40 is connected to a hub 78, a shaft 80, a one-way brake 82 and the damper 20. As previously mentioned, the damper 20 is connected with the output shaft 18 of the IC engine 16. The hub 68 and therefore carrier 48, and the hub 60 and therefore the ring gear 54, are connected by conventional selectively engageable fluid operated clutches 83 and 84, respectively, with the rotor 30. When either of the clutches 83 or 84 are engaged, the rotor 30 will be drivingly connected with the respective hub members 68 and 60, and therefore the gears connected therewith. The clutch 84 can be slippingly engaged, when desired, by the control 38 in a well known manner.

The multi-speed planetary transmission 12 includes a pair of planetary gear sets 86 and 88 having respective sun gears 90 and 92, ring gears 94 and 96, and carrier assemblies 98 and 100. The carrier assembly 98 includes pinion gears 102 meshing with the sun gear 90 and ring gear 94, and the carrier assembly 100 includes rotatably mounted pinions 104 meshing with the sun gear 92 and the ring gear 96.

The multi-speed planetary transmission 12 includes four conventional selectively engageable clutches 106, 108, 110 and 112, one disc brake 114, a pair of conventional fluid operated band brakes 116 and 118, and three one-way devices 120, 122 and 124.

The sun gear 90 is selectively connectible with the input shaft 76 by the one-way device 120 and/or selectively engageable clutch 106. The sun gear 92 is selectively drivingly connectible with the input shaft 76 by the clutch 110. The sun gear 92 is selectively connectible with ground by the one-way brake 122 and the disc brake 114. The sun gear 92 is also selectively engageable to be held stationary by the band brake 116.

The carrier assembly 100 is selectively drivingly connected with the input shaft 76 by clutch 108, with the ring gear 94 by the clutch 112, and can be held stationary by the band brake 118 and/or the one-way device 124. The ring gear 96 and carrier assembly 98 are drivingly connected with an output shaft 126 which is drivingly connected with a sun gear 128 which is a member of a final drive planetary 130. The planetary 130 also includes a ring gear 134 connected to a stationary housing 136 and a carrier assembly 138 drivingly connected with a conventional differential assembly 140. The carrier assembly 138 has a plurality of pinion gears 142 meshing with the sun gear 128 and ring gear 134, such that a reduction drive is provided between the transmission output shaft 126 and the differential 140.

Selective operation of the various clutches and brakes in the planetary transmission 12 will provide four forward speed ratios and one reverse ratio between the input shaft 76 and the output shaft 126. During the three lowest forward speed ratios, clutches 106 and 112 are engaged. For the first and lowest speed ratio, the one-way device 124 will be active and the one-way device 120 will be active in lieu of clutch 106. In the second speed ratio, the disc brake 114, and therefore one-way brake 122 will become active. In third gear, the clutch 108 is active, such that a 1:1 drive ratio is provided through the planetary transmission 12. For the fourth forward speed ratio, the clutch 108 and band brake 116 are active. To provide a reverse drive ratio, the clutch 110 and band brake 118 are active.

These fluid operated clutches and brakes are conventional control devices utilized with power transmissions and, in the present invention, are preferably actuated with hydraulic fluid supplied by the oil pump 34 and the hydraulic control 38.

The hybrid power transmission 10 is controllable through the clutches 83 and 84, one-way brake 64 and disc brake 66 and one-way brake 82 to provide electrical power input to the transmission 12, electrical and IC engine power input to the transmission 12, or IC power input to the transmission 12.

In providing these power inputs to the transmission 12, the hybrid transmission 10 is similar to that disclosed in U.S. Pat. No. 5,285,111, issued Feb. 8, 1994, to Sherman, and assigned to the assignee of the present invention. A similar hybrid power transmission is also disclosed in U.S. Ser. No. 08/125,901 filed Sep. 23, 1993, and assigned to the assignee of the present invention.

During electrical power input from the motor/generator 24, the engine 16 is stationary and the clutch 84 is engaged. With the engine 16 stationary, the one-way brake 82 will provide a ground reaction for the ring gear 46, such that a reduction drive between the sun gear 44 and the carrier assembly 48 will be provided to the chain drive 14. Thus, the multi-speed transmission 12 receives electrical drive input.

Figure 2:
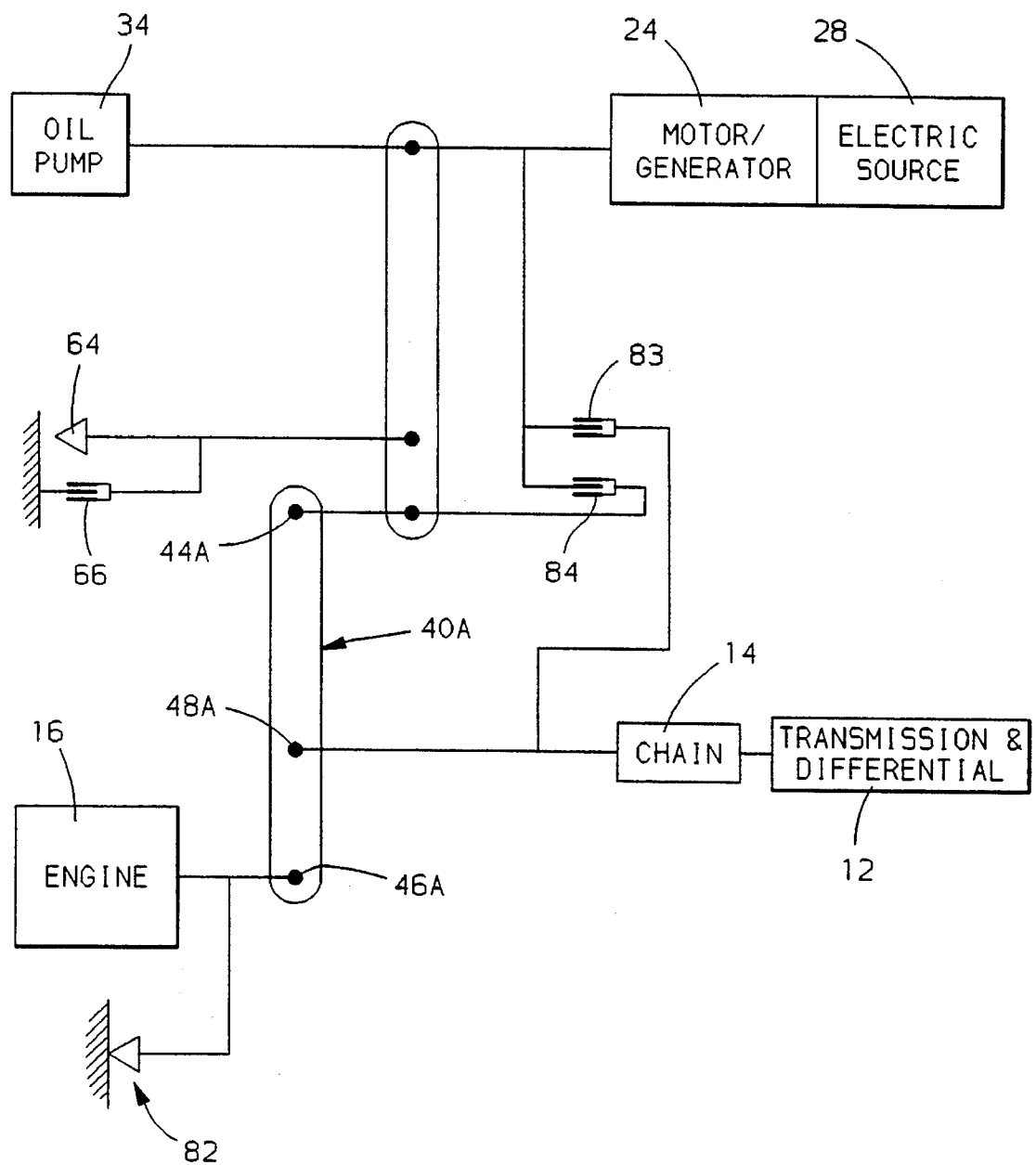
FIG. 2 is a lever diagram representing a portion of the powertrain shown in FIG. 1.

It is possible with the present invention to provide a starting drive to the engine 16 from the motor/generator 24 whether the vehicle driven by the planetary transmission 12 is stationary or in motion. When the vehicle, not shown, driven by the differential assembly 140 of the transmission 12, the motor/generator 24 is driven in a forward direction and the oil pump 34 is operable to provide energizing pressure to the clutches 83 and 84. With the clutches 83 and 84 energized, the planetary gear set 40, represented by the lever 40A in FIG. 2, is in a 1:1 drive condition, such that the engine 16 will be driven in the forward direction, thereby permitting one-way brake 82 to be overrun. This will permit engine starting when the vehicle is stationary.

Should it be desirable to drive the vehicle with the electrical input only, the motor/generator is operated and the oil pump 34 and hydraulic control 38 are controlled to establish engagement of the clutch 84. With the clutch 84 energized, the lever 40A will have an input at node 44A which represents the sun gear 44, while the node 46A which represents the ring gear 46 will be grounded by the one-way brake 82. Under this condition, the node 48A representing the carrier 48 will be driven forwardly at a reduced ratio, thereby providing a reduced input drive to the transmission 12.

In one form of the invention, it is considered that the sun gear 44 will have thirty teeth and the ring gear 46 will have fifty-eight teeth thereby providing a reduction drive of approximately 2.92 to 1 between the electric rotor 30 and the hub 78.

When the vehicle is being thus driven by the motor/generator 24 and it is desired to start the engine 16 while the vehicle is in motion, the clutch 83 is engaged thereby enforcing 1:1 drive ratio in the planetary gear set represented by the lever 40A. Under this condition, the speed of the rotor 30 is reduced to match the speed of the input to the transmission 12 while the engine is accelerated from stationary to a speed also equal to the rotor speed. During the engagement of the clutch 84, which is selectively controlled, a torque split of 60% to the transmission 12 and 40% to the internal combustion engine 16 will occur through the planetary gear arrangement 40. When sufficient torque level is achieved to disengage or unload the one-way brake 82, the combustion engine 16 will begin to rotate. This completes the torque phase of the shift occurring during the engagement of the clutch 84.

During the inertia phase of this shift, the inertia from the speed change of the motor/generator 24 from 2.9 times input speed to one times input speed is transferred through the slipping clutch 84 with 60% of the torque driving the vehicle and 40% driving the internal combustion engine 16. When the engine 16 reaches a speed equal to that desired for starting, fuel and ignition are supplied to the engine 16 and the clutch 84 is fully engaged. This puts the vehicle input drive in the hybrid mode.

While the vehicle is moving, if it is desirable to disengage the engine 16, the fuel and ignition to the engine 16 are ceased and the clutch 84 is released. When this occurs, the speed of the motor/generator 24 will increase to approximately 2.9 times the speed it was prior to the disengagement of the clutch 84, the internal combustion engine rotation will decrease and eventually stop thereby permitting engagement of the one-way brake 82, such that the hybrid transmission will be in the electric drive mode with the internal combustion engine stationary and inoperative.

The system described provides starting of the internal combustion engine 16 by the motor/generator 24 whether the vehicle is stationary or in motion, and likewise, permits disengagement of the engine 16 whether the vehicle is stationary or in motion.

The embodiments of the invention in which an exclusive property or privilege is claimed are defined as follows:

1. A power transmission and power source comprising:

an electric power source;

an internal combustion power source including a shaft having a first direction of operation;

a multi-range planetary gear arrangement;

a combining planetary gear arrangement operatively connected between said electrical power source, said internal combustion power source and said multi-range planetary gear arrangement, said combining planetary gear arrangement having a plurality of members;

a first one-way torque transmitting means for selectively grounding a first member of the combining planetary gear arrangement and said internal combustion power source connected therewith for preventing operation of the shaft opposite to said first direction of operation;

a first friction clutch means for selectively connecting the electrical power source with a second member of the combining planetary gear arrangement and with an input member of the multi-range planetary gear arrangement;

a second friction clutch means for selectively connecting the electrical power source with a third member of the combining planetary gear arrangement and for cooperating with said first friction clutch means and said electrical power source to initiate operation of said internal combustion power source and for cooperating with the first one-way torque transmitting means to establish a drive path in the combining planetary gear arrangement between the electrical power source and the multi-range planetary gear arrangement when the internal combustion power source is inoperative.

2. A power transmission and power source comprising:

an electrical power source;

an internal combustion power source including a shaft having a first direction of operation;

a multi-range planetary gear arrangement;

a combining planetary gear arrangement operatively connectible between said electrical power source, said internal combustion power source and said multi-range planetary gear arrangement said combining planetary gear arrangement including two planetary gear sets, each having a sun gear, a ring gear and a carrier assembly;

a first one-way torque transmitting means for selectively grounding the ring gear of one of the planetary gear sets of the combining planetary gear arrangement and said shaft of the internal combustion power source for preventing operation of the shaft opposite to said first direction of operation;

a first friction clutch means for selectively connecting the electrical power source with the carrier assembly of the one planetary gear set of the combining planetary gear arrangement, and with an input member of the multi-range planetary gear arrangement;

a second friction clutch means for selectively connecting the electrical power source with the ring gear of the other planetary gear set and the sun gear of the one planetary gear set of the combining planetary gear arrangement and for cooperating with said first friction clutch means and said electrical power source to initiate operation of said internal combustion power source and for cooperating with the first one-way torque transmitting means to establish a drive path in the combining planetary gear arrangement between the electrical power source and the multi-range planetary gear arrangement when the internal combustion power source and the first friction clutch means are inoperative.

* * * * *